United States Patent
Ozbag

(10) Patent No.: US 11,958,079 B2
(45) Date of Patent: Apr. 16, 2024

(54) HAZELNUT PROCESSING PLANT WITH IMPROVED CALIBRATION AND BREAKING CHARACTERISTICS

(71) Applicant: BALSU GIDA SANAYI VE TICARET ANONIM SIRKETI, Sakarya (TR)

(72) Inventor: Nusret Ozbag, Sakarya (TR)

(73) Assignee: BALSU GIDA SANAYI VE TICARET ANONIM SIRKETI, Sakarya (TR)

( * ) Notice: Subject to any disclaimer, the term of this patent is extended or adjusted under 35 U.S.C. 154(b) by 0 days.

(21) Appl. No.: 18/245,903

(22) PCT Filed: Jan. 19, 2022

(86) PCT No.: PCT/TR2022/050041
§ 371 (c)(1),
(2) Date: Mar. 20, 2023

(87) PCT Pub. No.: WO2022/250627
PCT Pub. Date: Dec. 1, 2022

(65) Prior Publication Data
US 2023/0381819 A1 Nov. 30, 2023

(30) Foreign Application Priority Data
May 26, 2021 (TR) ................. 2021/008705

(51) Int. Cl.
*B07B 9/00* (2006.01)
*A23N 5/00* (2006.01)
*B07B 11/06* (2006.01)

(52) U.S. Cl.
CPC .............. *B07B 9/00* (2013.01); *A23N 5/00* (2013.01); *B07B 11/06* (2013.01)

(58) Field of Classification Search
CPC .............. B07B 9/00; B07B 11/06; A23N 5/00
See application file for complete search history.

(56) References Cited

U.S. PATENT DOCUMENTS

| 4,552,262 A | * | 11/1985 | Murakami | ........... A22C 29/005 198/456 |
| 2003/0059508 A1 | * | 3/2003 | Broyles | .................... A23N 5/00 426/481 |

(Continued)

FOREIGN PATENT DOCUMENTS

| CN | 108497507 A | 9/2018 |
| CN | 211225094 U | 8/2020 |

(Continued)

OTHER PUBLICATIONS

Trabzon Hazelnut Cracking Plant Pre-Feasibility Report, Eastern Black Sea Development Agency, 2014, pp. 23-24.

(Continued)

*Primary Examiner* — Michael McCullough
*Assistant Examiner* — Kalyanavenkateshware Kumar
(74) *Attorney, Agent, or Firm* — Bayramoglu Law Offices LLC

(57) ABSTRACT

A hazelnut processing plant provides separation of unshelled hazelnut as shell and as decorticated hazelnut by means of breaking the shells thereof. The hazelnut processing plant includes at least one calibration sieve where the unshelled hazelnut is transferred in order to be categorized in accordance with the dimensions thereof, at least one calibration line which has at least one each calibration silos for each category of the unshelled hazelnut separated according to dimensions in said calibration sieve, at least one stone, where the unshelled hazelnut is transferred in order to be separated from the shell thereof, at the continuation of said calibration line, at least one charger sieve which can separate the hazelnut broken at said stone by sieving the dust of said (Continued)

hazelnut, at least one breaking line, which has at least one ventilator in order to provide separation of decorticated hazelnuts, shells and creased hazelnuts.

7 Claims, 3 Drawing Sheets

(56) References Cited

U.S. PATENT DOCUMENTS

| 2004/0146628 | A1* | 7/2004 | Walter | A23K 10/37 |
| | | | | 426/630 |
| 2017/0297170 | A1* | 10/2017 | Panzenhagen | B07B 11/04 |
| 2020/0138083 | A1* | 5/2020 | Li | B03B 4/02 |

FOREIGN PATENT DOCUMENTS

| GB | 873850 A | 7/1961 |
| RU | 10323 U1 | 7/1999 |

OTHER PUBLICATIONS

Pre-Feasibility Report on Nut Crushing and Processing Plant Investment, Eastern Black Sea Development Agency (DOKA), 2017, pp. 41-42.

Selvi K.C., General Mechanization of Shelled Hazelnut Processing Plants, ISB-INMA TEH, 2017, pp. 105-110.

* cited by examiner

HAZELNUT PROCESSING PLANT WITH IMPROVED CALIBRATION AND BREAKING CHARACTERISTICS

CROSS REFERENCE TO THE RELATED APPLICATIONS

This application is the national phase entry of International Application No. PCT/TR2022/050041, filed on Jan. 19, 2022, which is based upon and claims priority to Turkish Patent Application No. 2021/008705, filed on May 26, 2021, the entire contents of which are incorporated herein by reference.

TECHNICAL FIELD

The present invention relates to a hazelnut processing plant which provides separation of unshelled hazelnut as shell and as decorticated hazelnut by means of breaking the shells of unshelled hazelnut.

BACKGROUND

Hazelnut processing plants include process steps until turning unshelled hazelnut into decorticated hazelnut. These process steps can include breaking, cleaning and packaging of hazelnut. Hazelnut is presented to market after being subjected to breaking and cleaning processes in hazelnut processing plants. Thus, plants, which exist at close distance where hazelnut breaking and cleaning processes can be realized, are an important need for the hazelnut producer for presenting the product to the market without devaluation of the product.

Hazelnut breaking systems are separated into two systems as orthogonal and horizontal systems. Both hazelnut breaking systems have some advantages and some disadvantages. The most important disadvantage is the first investment cost. The main aim in both hazelnut breaking systems is to obtain hazelnut with maximum efficiency and maximum product quality by subjecting hazelnut to minimum mechanical process (like elevator, conveyor, etc.). The primary aim is to minimize bashed hazelnut and broken hazelnut (fragmented hazelnut) which lead to value loss for hazelnut. Today, the total broken and bashed hazelnut proportion in hazelnut processing plants is at least 6% and the aim is to obtain a proportion lower than 1%. The differences from other hazelnut breaking systems are that the product is separated from its own shell and from the crease therein and from the broken hazelnut thanks to the wide hazelnut separation ventilator, and the labor cost is reduced, and moreover, thanks to this system, it is aimed to prevent the hazelnut parts which are unshelled and to increase the efficiency of the plant.

The application with number CN108497507A known in the literature relates to a hazelnut breaking system. The invention includes a product feeding system, a sectioning system and a control unit. The control system is electrically connected to the sectioning system. The invention enables product monitoring and not accumulation and squeezing of the products since product monitoring can be realized automatically before passing of the hazelnuts to the breaking unit. In the product, calibration setting of the hazelnut breaking system is realized and breaking process can be realized according to product dimension. However, the system does not enable dimensional calibration for the breaking system of hazelnuts.

The application with number CN211225094U known in the literature relates to a hazelnut breaking system. The invention has a feeding unit, a chain transfer mechanism and a pressing mold. In the invention, thanks to the threaded shaft actuated by means of the chained transmission mechanism, automatic feeding is realized in a stepped manner. Thanks to the chambers which exist in the threaded shaft, the hazelnuts move in a stepped manner and do not squeeze.

These embodiments known in the art are related to improvement of the process by means of various aspects while hazelnut is being processed. However, these embodiments are not sufficient for complete improvement of the hazelnut production process. As a result, because of the abovementioned problems, an improvement is required in the related technical field.

SUMMARY

The present invention relates to a hazelnut processing plant, for eliminating the abovementioned disadvantages and for bringing new advantages to the related technical field.

An object of the present invention is to provide a hazelnut processing plant which can improve the process of turning unshelled hazelnut into decorticated hazelnut.

Another object of the present invention is to provide a hazelnut processing plant with improved calibration and breaking characteristics.

In order to realize the abovementioned objects and the objects which are to be deducted from the detailed description below, the present invention is a hazelnut processing plant which provides separation of unshelled hazelnut as shell and as decorticated hazelnut by means of breaking the shells thereof. Accordingly, the improvement is that the subject matter hazelnut processing plant includes at least one calibration sieve where the unshelled hazelnut is transferred in order to be categorized in accordance with the dimensions thereof, at least one calibration line which has at least one each calibration silos for each category of the unshelled hazelnut separated according to dimensions in said calibration sieve, at least one stone, where the unshelled hazelnut is transferred in order to be separated from the shell thereof, at the continuation of said calibration line, at least one charger sieve which can separate the hazelnut broken at said stone by sieving the dust of said hazelnut, at least one breaking line, which has at least one ventilator in order to provide separation of decorticated hazelnuts, shells and creased hazelnuts by means of air flow, at the continuation of said charger sieve. Thus, a structure, with improved calibration and breaking characteristics, is obtained in the hazelnut processing plant.

In a possible embodiment of the present invention, at least one sensor is provided for use in detection of fullness of said calibration silo. Thus, extra personnel need for monitoring fullness of the calibration silo is eliminated.

In another possible embodiment of the present invention, the calibration line includes at least one calibration elevator for providing feeding of unshelled hazelnut to the calibration sieve. Thus, the unshelled hazelnut is raised from the floor and is given to the calibration sieve.

In another possible embodiment of the present invention, the breaking line includes at least one breaking elevator for providing feeding of unshelled hazelnut to the stone. Thus, the unshelled hazelnut is raised from the floor and is given to the intermediate silo where fullness detection can be realized and is given to the stone via vibratory feeding table from here.

In another possible embodiment of the present invention, at least one ventilator is provided at the continuation of said charger sieve in the breaking line. Thus, the dust and the tiny wastes in the broken unshelled hazelnut are cleaned by means of air flow.

In another possible embodiment of the present invention, the breaking line includes at least one rounded sieve where said creased hazelnuts are sieved. Thus, the hazelnuts which have creased inner part are sieved and are discharged or given to the plant.

In another possible embodiment of the present invention, at least one intermediate silo, which can realize fullness detection, includes at least one vibratory feeding table for feeding unshelled hazelnut to the stone. Thus, unshelled hazelnut is fed within a predetermined arrangement to the stone.

REFERENCE NUMBERS

Figure 1:
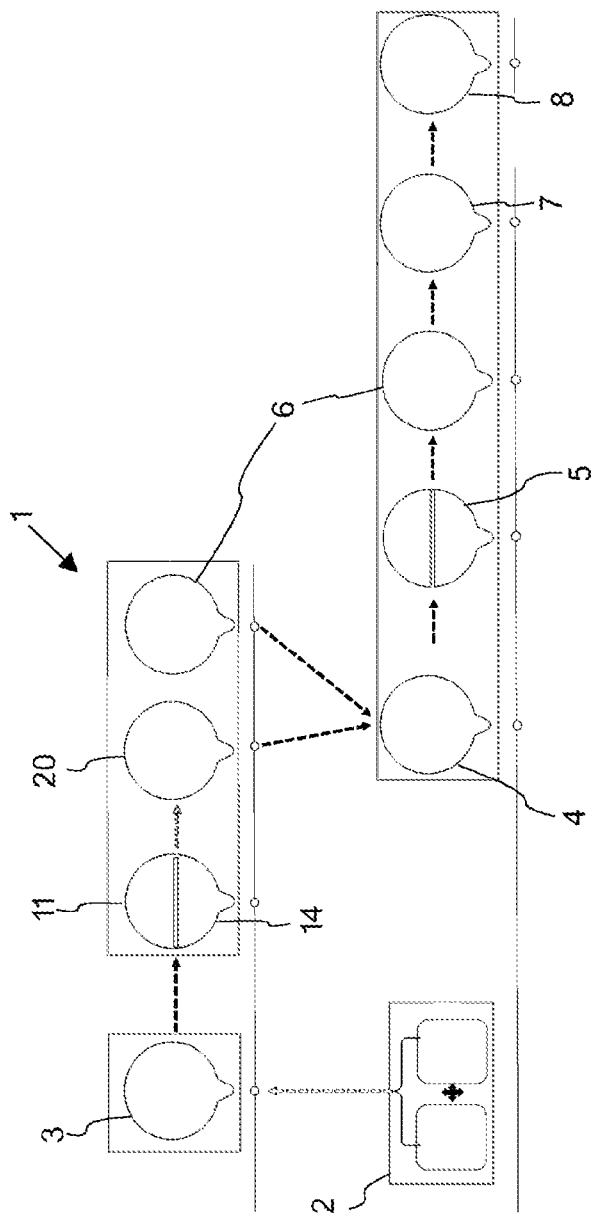
In FIG. 1, a representative schematic view of the subject matter hazelnut processing plant is given.

1 Hazelnut processing plant
10 Calibration line
11 Calibration sieve
12 Carrying band
13 Calibration elevator
14 Calibration silo
  141 Sensor
15 Transfer band
20 Breaking line
21 Breaking elevator
22 Intermediate silo
221 Vibratory feeding table
23 Stone
24 Charger sieve
25 Ventilator
26 Rounded sieve
2 Unshelled hazelnut taking point
3 Unshelled hazelnut silo
4 Pre-cleaning
5 Decorticated hazelnut calibration
6 Laser line
7 Manual selecting area
8 Filling

DETAILED DESCRIPTION OF THE EMBODIMENTS

In this detailed description, the subject matter is explained with references to examples without forming any restrictive effect only in order to make the subject more understandable.

In FIG. 1, a representative schematic view of the subject matter hazelnut processing plant (1) is given. Accordingly, said hazelnut processing plant (1) is configured to provide processing and obtaining decorticated hazelnut from unshelled hazelnut. The hazelnut processing plant (1) separates the shells and dust of the hazelnut which has been removed from the branch. In order to be able to realize this, some lines and the components which exist in said lines must operate in a synchronized manner in the hazelnut processing plant (1). The first step in the hazelnut processing plant (1) begins with carrying unshelled hazelnuts from the unshelled hazelnut taking point (2) to the unshelled hazelnut silos (3) by means of carrier items. In this carrying process, the unshelled hazelnut can be carried by means of various mechanical and aerial methods. Afterwards, the unshelled hazelnut is advanced in a calibration line (10). Then, the hazelnut separated according to its dimensions is put into silo again. The unshelled hazelnuts separated according to their dimensions are separated from their shells by means of a breaking line (20). Afterwards, the hazelnut becomes decorticated hazelnut. Decorticated hazelnut is advanced through pre-cleaning (4), decorticated hazelnut calibration (5), laser line (6), manual selecting area (7) and filling (8) stages and the processing is completed.

Figure 2:
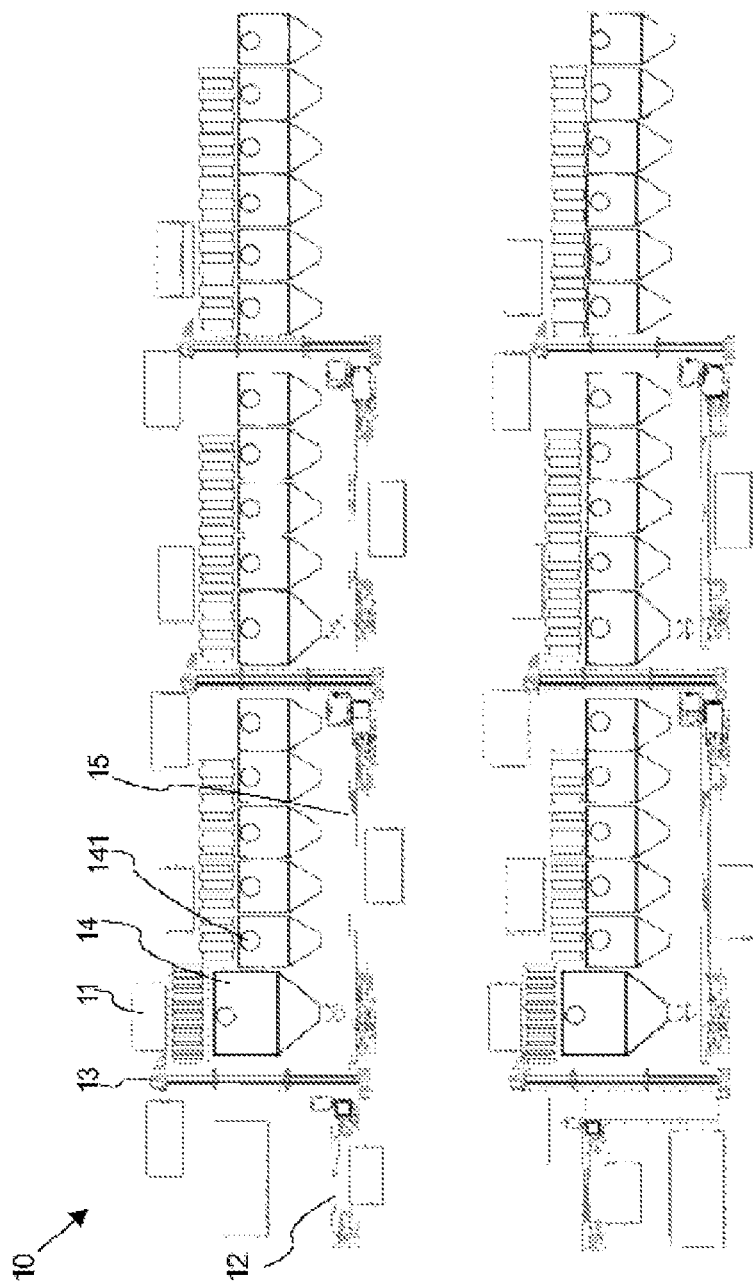
In FIG. 2, a representative schematic view of the calibration line provided in the subject matter hazelnut processing plant is given.

In FIG. 2, a representative schematic view of the calibration line (10) provided in the subject matter hazelnut processing plant (1) is given. Said calibration line (10) is configured to provide classification of unshelled hazelnut according to the dimensions thereof. In order to be able to realize this, there is at least one calibration sieve (11) in the calibration line (10). Said calibration sieve (11) provides classification of hazelnut in predetermined dimensions. In order to be able to realize this, there can be spaces, which have different gaps, on the calibration sieve (11). These different gaps are effective in separation of the hazelnut according to the diameter thereof. Hazelnut is separated into different dimension categories like 17.5, 18, 18.5, 19, 15, 15.5, 16, over-sieve. These separated unshelled hazelnuts can be accumulated in separate calibration silos (14). There can be at least one carrying band (12) and at least one calibration elevator (13) in feeding the hazelnut to the calibration sieve (11). This carrying band (12) provides carrying of the unshelled hazelnut from the unshelled hazelnut silo (3) to said calibration elevator (13). In the calibration line (10), there can be pluralities of carrying bands (12) and pluralities of calibration elevators (13) depending on the number of hazelnut categories. In the calibration silos (14), the hazelnut fullness proportions can be detected by means of at least one each sensors (141). This sensor (141) provides detection of the fullness of calibration silos (14) and moreover this sensor (141) eliminates the need for human power and time loss. The sensor (141) described in the invention can realize fullness detection in a manner detecting weight and realizing level detection in possible embodiments. The calibration silos (14) are connected to at least one each transfer bands (15). Said transfer band (15) enables carrying of the calibrated unshelled hazelnut from the calibration line (10) to the breaking line (20). The calibration silos (14) can be connected to more than one transfer band (15). Thanks to this, unshelled hazelnut can be carried from the calibration silos (14) to more than one breaking line (20). In a possible embodiment of the present invention, pluralities of calibration lines (10) can be provided which can enable separation to different diameters depending on diameter categories of unshelled hazelnut.

Figure 3:
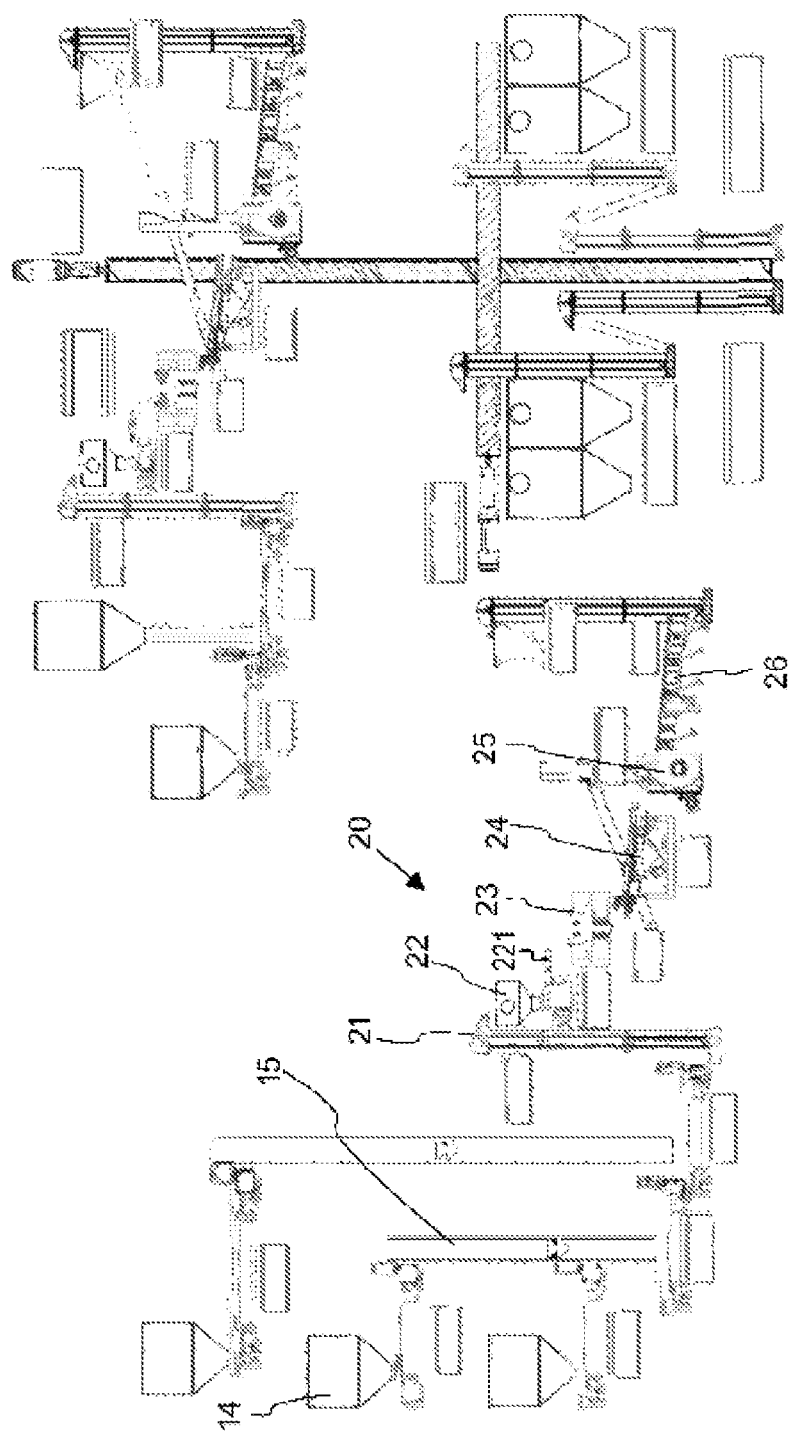
In FIG. 3, a representative schematic view of the breaking line provided in the subject matter hazelnut processing plant is given.

In FIG. 3, a representative schematic view of the breaking line (20) provided in the subject matter hazelnut processing plant (1) is given. Accordingly, the breaking line (20) is configured to separate the unshelled hazelnut as decorticated hazelnut and as shell. In order to be able to realize this, the breaking line (20) is associated with the transfer bands (15). The unshelled hazelnut taken from the transfer band (15) is at least partially raised by means of a breaking elevator (21).

The raised hazelnut is fed to at least one intermediate silo (22) which can realize fullness detection, and is fed to at least one stone (23) by means of at least one vibratory feeding table (221). Said stone (23) has a first breaking surface and a second breaking surface which are distanced depending on the calibration distance and enables breaking of the shell of the hazelnut without giving damage to the inner part of the hazelnut. The stone (23) is adjusted depending on the calibration diameter of the hazelnut before breaking. Thanks to this, undesired internal breakages are prevented. Said vibratory feeding table (221) is configured to realize unshelled hazelnut feeding depending on the breaking capacity of the stone (23). The vibratory feeding table (221) carries the unshelled hazelnut, existing thereon, by vibrating, and thanks to this, the vibratory feeding table (221) feeds the stone (23). The hazelnut broken at the stone (23) is transferred to at least one charger sieve (24). Said charger sieve (24) provides sieving of unshelled hazelnut broken before at least one ventilator (25) and provides separation from each other as shell and as decorticated hazelnut. At the charger sieve (24), the shell and the hazelnut are sieved and separated from each other, and moreover the dust which exists on the inner hazelnut is also separated. The hazelnut, whose shell and decorticated part are separated from each other, is transferred to the ventilator (25). The hazelnut is separated into three different categories at the ventilator (25). These are decorticated hazelnuts, shells and creases. While this process is realized at the ventilator (25), air flow is applied onto the hazelnut. As a result of the air flow; hazelnuts, shells and creases are positioned at different locations from each other depending on the specific weight of hazelnut. Thanks to this, the shells which cannot be sieved at the charger sieve (24) are separated again in this part. The creased hazelnut and the shell which exit the ventilator (25) are accumulated in silos assigned for them. Said decorticated hazelnut and unshelled hazelnut which is not completely broken, are passed through at least one rounded sieve (26). After the rounded sieve (26), the unshelled hazelnuts, which have decorticated hazelnut amount which is over a predetermined level, are carried to the breaking elevator (21) before the vibratory feeding table (221), and a breaking line (20) cycle is provided. Pluralities of breaking lines (20) can be provided which are equal in number to each transfer band (15) in the hazelnut processing plant (1). Thanks to this, the production capacity of the hazelnut processing plant (1) is increased.

In a possible embodiment of the present invention, the unshelled hazelnut is carried from the unshelled hazelnut silos (3) to the calibration elevator (13) and to the calibration sieve (11) by means of the carrying band (12). The unshelled hazelnuts are separated according to their dimensions in the calibration sieve (11), and are accumulated in calibration silos (14). The fullness of the calibration silos (14) can be detected by means of said sensor (141). Afterwards, as needed, the unshelled hazelnut is carried from the calibration silos (14) to the breaking line (20) by means of the transfer bands (15). The unshelled hazelnut in the breaking line (20) is fed to the intermediate silo (22), where fullness detection can be made, by means of a breaking elevator (21) and to the vibratory feeding table (221) from here and to the stone (23) from there. The hazelnut, whose shell part is broken at the stone (23), is completely separated from the shell and the dust thereof by means of the charger sieve (24) and the ventilator (25). Meanwhile, the hazelnuts, which are not completely broken and which are half unshelled, can enter a breaking line (20) cycle by means of a rounded sieve (26). The shells can be carried to silos assigned for them as creased and decorticated hazelnut. In this carrying process, the shells and the hazelnut are advanced on the carrying lines such that the operator can see said shells and hazelnut. Thanks to this, when incompliancy is detected by the operator, the system can be interfered instantaneously. After this process, the decorticated hazelnut is advanced through said pre-cleaning (4), decorticated hazelnut calibration (5), laser line (6), manual selecting area (7) and filling (8) stages and processing is completed.

By means of all these embodiments, the steps of turning unshelled hazelnut into decorticated hazelnut are optimized, and an improved hazelnut processing plant (1) is obtained. As the fullness proportions of the calibration silos (14) are detected automatically in the calibration line (10) and as the need for extra elevators in the breaking plant is reduced, important saving is provided in terms of labor and time. Additionally, thanks to the structure of the breaking line (20), the need for extra elevator is eliminated.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

What is claimed is:

1. A hazelnut processing plant, providing a separation of an unshelled hazelnut as a shell and as a decorticated hazelnut by means of breaking the shell of the unshelled hazelnut, the hazelnut processing plant comprising:
   at least one calibration sieve where the unshelled hazelnut is transferred in order to be categorized in accordance with dimensions of the unshelled hazelnut, wherein the at least one calibration sieve is configured to filter the unshelled hazelnut from other nuts based on a calibration diameter corresponding to a size of the unshelled hazelnut;
   at least one calibration line, wherein the at least one calibration line has at least one calibration silo for each category of the unshelled hazelnut separated according to dimensions in the at least one calibration sieve;
   at least one stone where the unshelled hazelnut is transferred from the at least one calibration line in order to be separated from the shell of the unshelled hazelnut at a continuation of the at least one calibration line, wherein the at least one stone comprises a first breaking surface and a second breaking surface, wherein a distance between the first breaking surface and the second breaking surface corresponds to said calibration diameter such that the shell of the hazelnut is broken without damaging an inner part of the hazelnut;
   at least one charger sieve, wherein the at least one charger sieve is configured to separate the hazelnut broken at the at least one stone by sieving a dust of the hazelnut;
   at least one breaking line, wherein the at least one breaking line has at least one ventilator in order to provide a separation of the decorticated hazelnuts, the shells and creased hazelnuts by means of air flow at a continuation of the at least one charger sieve; and
   at least one sensor provided for use in a detection of a fullness of the at least one calibration silo.

2. The hazelnut processing plant according to claim 1, wherein the at least one calibration line comprises at least one calibration elevator for providing a feeding of the unshelled hazelnut to the at least one calibration sieve.

3. The hazelnut processing plant according to claim 1, wherein the at least one breaking line comprises at least one breaking elevator for providing a feeding of the unshelled hazelnut to the at least one stone.

4. The hazelnut processing plant according to claim 1, wherein the at least one ventilator is provided at the continuation of the at least one charger sieve in the at least one breaking line and configured to allow decorticated hazelnuts, shells and creases of the hazelnut to be positioned at different locations from each other as a result of air flow.

5. The hazelnut processing plant according to claim 1, wherein the at least one breaking line comprises at least one rounded sieve where the creased hazelnuts are sieved.

6. The hazelnut processing plant according to claim 1, comprising at least one vibratory feeding table provided for feeding the unshelled hazelnut to the at least one stone.

7. A hazelnut processing method applied by a hazelnut processing plant to provide a separation of an unshelled hazelnut as a shell and as a decorticated hazelnut by means of breaking the shell of the unshelled hazelnut, the hazelnut processing method comprising:

transferring, by at least one calibration sieve, the unshelled hazelnut in order to be categorized in accordance with dimensions of the unshelled hazelnut, wherein the at least one calibration sieve filters the unshelled hazelnut from other nuts based on a calibration diameter corresponding to a size of the unshelled hazelnut;

accumulating, by at least one calibration silo of at least one calibration line, each category of the unshelled hazelnut separated according to dimensions in the at least one calibration sieve;

separating, by at least one stone, the unshelled hazelnut transferred from the at least one calibration line from the shell of the unshelled hazelnut at a continuation of the at least one calibration line;

separating, by at least one charger sieve, the hazelnut broken at the at least one stone by sieving a dust of the hazelnut;

separating, by at least one ventilator of at least one breaking line, the decorticated hazelnuts, the shells and creased hazelnuts by means of air flow at a continuation of the at least one charger sieve;

detecting, by at least one sensor, a fullness of the at least one calibration silo, wherein the hazelnut processing method further comprises adjusting a distance between a first breaking surface and a second breaking surface of the at least one stone based on said calibration diameter such that the shell of the hazelnut is broken without damaging an inner part of the hazelnut during said separating, by the at least one stone, the unshelled hazelnut.

* * * * *